(12) United States Patent
Hong

(10) Patent No.: US 6,823,896 B2
(45) Date of Patent: Nov. 30, 2004

(54) VALVE ASSEMBLY OF A RECIPROCAL COMPRESSOR

(75) Inventor: Myung-jung Hong, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 166 days.

(21) Appl. No.: 10/090,232

(22) Filed: Mar. 4, 2002

(65) Prior Publication Data

US 2002/0157717 A1 Oct. 31, 2002

(30) Foreign Application Priority Data

Apr. 28, 2001 (KR) ........................................ 2001-23240

(51) Int. Cl.⁷ .............................................. F16K 15/16
(52) U.S. Cl. ...................................... 137/856; 137/857
(58) Field of Search .................................. 137/856, 857

(56) References Cited

U.S. PATENT DOCUMENTS

| | | | | |
|---|---|---|---|---|
| 735,912 A | * | 8/1903 | Schrotz | 137/527 |
| 2,154,880 A | * | 4/1939 | Twigg | 137/857 |
| 2,161,769 A | * | 6/1939 | Trask | 137/857 |
| 4,542,768 A | * | 9/1985 | Harris | 137/856 |

* cited by examiner

*Primary Examiner*—Kevin Lee
(74) *Attorney, Agent, or Firm*—Westman, Champlin & Kelly, P.A.

(57) ABSTRACT

A valve assembly of a close-type reciprocal compressor. The valve assembly includes a valve plate disposed between a cylinder body and a cylinder head, a reed valve for opening and sealing a refrigerant discharge hole formed at the valve plate, a first stopper for resisting against a bending force of the reed valve bent when the refrigerant is discharged, a second stopper for resisting against a bending force of the first stopper by the reed valve, a keeper for limiting bending degree of the second stopper by the first stopper, and a bolt engaged with the keeper for connecting with the stopper bent by the reed valve. When refrigerant discharge pressure is increased, the resisting force against the bending force is added by the first stopper and the second stopper in turn, and thus compressing efficiency is increased by changing opening degree of the reed valve corresponding to the change of the pressure, and at the same time, noise can be reduced by lessening shock added to the reed valve. Moreover, when there is an abnormal increase of the refrigerant discharge pressure, the deformation degree of the second stopper limited by the keeper can be controlled by using the bolt.

8 Claims, 3 Drawing Sheets

VALVE ASSEMBLY OF A RECIPROCAL COMPRESSOR

The present application is based on and claims the benefit of Korean patent application Serial Nos. 2001-23240, filed Apr. 28, 2001, the contents of which are hereby incorporated by reference in their entirety.

BACKGROUND OF THE INVENTION

1. Field of the Invention

The present invention relates to a valve assembly of a reciprocal compressor, and more particularly to a valve assembly, installed on a cylinder head of a compressor for controlling discharge operation of refrigerant compressed in a cylinder.

2. Description of the Related Art

A freezing system such as a refrigerator has a compressor for compressing refrigerant. FIG. 1 illustrates a hermetic reciprocal compressor as one example of the compressor.

The compressor 1 has a casing 3 having a sealed inner space defined therein, a cylinder device 21 for compressing the refrigerant, and a driving motor 11 for driving the cylinder device 21.

In the casing 3 are formed a suction pipe 5 for drawing in gaseous refrigerant, a discharge pipe (not shown) for discharging refrigerant compressed by the compressor 1, and an electric terminal 9 for supplying electrical power to the compressor 1. The driving motor 11 has a stator 13, a rotor 15, and a shaft 19 rotated by the rotor 15. When the power is supplied through the electric terminal 9, the shaft 19 is rotated by the driving motor 11. The shaft 19 has an eccentric shaft 20 at a lower part thereof.

The cylinder device 21 comprises a cylinder body 23 having a cylinder chamber 23a defined therein, a cylinder head 65 installed on the cylinder body 23, a piston 25 reciprocating in the cylinder chamber 23a, and a connecting rod 27 connecting the piston 25 with the eccentric shaft 20. The eccentric shaft 20 and the connecting rod 27 convert a rotational movement of the shaft 19 into a reciprocating motion of the piston 25.

One side of the cylinder body 23 is open, and the cylinder head 65 is disposed to seal the open side. A valve assembly 30 having a valve plate 31 and a reed valve 61 is disposed between the cylinder body 23 and the cylinder head 65. A discharge hole 31b for discharging the refrigerant from the cylinder chamber 23a and a suction hole 31a for drawing the refrigerant into the cylinder chamber 23a are formed at the valve plate 31. The refrigerant, drawn from the outside through the suction pipe 5, is drawn into the cylinder chamber 23a through the suction hole 31a, and compressed in the cylinder chamber 23a by the reciprocal motion of the piston 25, and is discharged to the discharge pipe (not shown) through the discharge hole 31b.

FIG. 2 is a partial enlarged view of FIG. 1, showing the valve assembly 30 disposed between the cylinder body 23 and the cylinder head 65. The valve assembly 30 comprises the valve plate 31 having the suction hole 31a (not shown in FIG. 2) and the discharge hole 31b as described above, the reed valve 61, disposed at the valve plate 31, for opening/closing the discharge hole 31b, a stopper 71 disposed above the reed valve 61, and a keeper 73 disposed above the stopper 71.

The keeper 73 is secured to the valve plate 31 by a settling bolt 75, and the reed valve 61 and the stopper 71 are secured to the valve plate 31 by the keeper 73. When the refrigerant in the cylinder 23a is discharged through the discharge hole 31b, the reed valve 61 is bent upwardly by the discharge force of the refrigerant. In such as situation, the stopper 71 gives a resistant force against the upwardly bending force of the reed valve 61. The keeper 73 limits deformation range of the stopper 71, when the stopper 71 is deformed by the bending force of the reed valve 61. Due to the function of the keeper 73, the deformation of the reed valve 61 and the stopper 71 is maintained without any changes, and the operation of the reed valve 61 and the stopper 71 is performed with stability, even though there is a constant repetition of opening/closing operations of the reed valve 61.

However, in such a conventional valve assembly 30 with the above construction, the location of the stopper 71 and the keeper 73 is fixed at one place, so there is a disadvantage that the reed valve 61 cannot operate actively, when discharge pressure of the refrigerant is high. In other words, when the discharge pressure of the refrigerant becomes abnormally high; the bending deformation force for opening the discharge hole 31b of the reed valve 61 also becomes abnormally great. Even in this case, since the location of the stopper 71 limited by the keeper 73 and the resistant force given by the stopper 61 are not changed, pressure in the cylinder chamber 23a increases because the opening degree of the discharge hole 31b is limited. Due to the increase of the pressure, the refrigerant cannot be discharged actively, and also compressing efficiency of the compressor 1 is decreased. Moreover, as a colliding force between the reed valve 61 and the stopper 71 increases, noise generated thereby also increases, and there is a possibility that the reed valve 61 and the stopper 71 are broken.

SUMMARY OF THE INVENTION

The present invention has been made to overcome the above-mentioned problems of the related art. Accordingly, it is an object of the present invention to provide a valve assembly of a reciprocal compressor capable of controlling opening degree of a reed valve by controlling bending deformation degree of the reed valve and a discharge hole according to increase and decrease of discharge pressure.

The above object of the present invention is accomplished by providing a valve assembly including a valve plate disposed between a cylinder body and a cylinder head and having a refrigerant discharge hole; a reed valve for sealing and opening the refrigerant discharge hole; a first stopper for resisting against a bending deformation force of the reed valve bent by a discharge force of refrigerant while the refrigerant is discharged through the refrigerant discharge hole; at least one second stopper for resisting against the bending deformation force of the first stopper by the reed valve; and a keeper for limiting degree of bending of the second stopper caused by the first stopper.

A controlling means for controlling the biggest bending degree of the second stopper is disposed at some part of the keeper. The controlling means can be a spring inserted between the second stopper and the keeper. Moreover, it can be a bolt settled at the keeper and connected with the second stopper bent by the first stopper, and distance between the second stopper and the bolt is controlled in accordance with the settling degree.

According to another preferred embodiment of the present invention, the valve assembly includes a valve plate disposed between a cylinder body and a cylinder head and having a refrigerant discharge hole; a reed valve for opening/closing the refrigerant discharge hole; a stopper for resisting against bending force of the reed valve while refrigerant is discharged through the refrigerant discharge hole; a keeper for limiting the degree of bending of the stopper caused by the reed valve, and a bolt settled at the keeper and connected with the stopper bent by the reed valve; and distance between the stopper and the bolt is controlled in accordance with the settling degree. It is preferable that a spring, for resisting against a bending deformation force of the stopper, is disposed between the stopper and the bolt.

According to the present invention, since a resisting force against the deformation of the reed valve is changed in accordance with change of discharge pressure of the refrigerant, discharging operation of the refrigerant is performed without any difficulties, and compressing efficiency is increased. Also, breakage of the reed valve can be prevented and noise is reduced because the shock of the reed valve is reduced.

BRIEF DESCRIPTION OF THE DRAWINGS

The described objects and features of the present invention will be more apparent by explaining the preferred embodiment of the present invention by referring to the appended drawings, in which.

DETAILED DESCRIPTION OF THE PREFERRED EMBODIMENT

Figure 1:
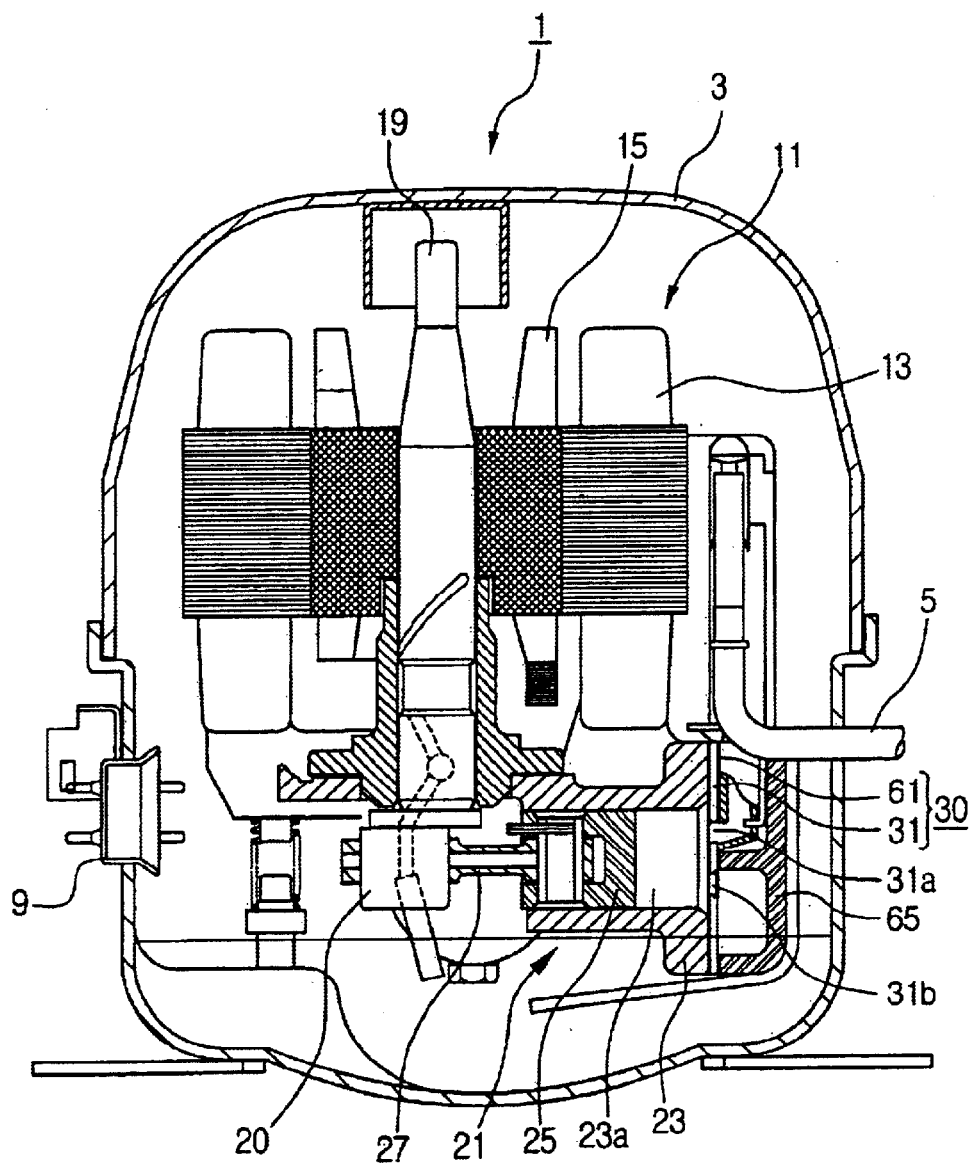
FIG. 1 is a side sectional view showing a conventional close-type reciprocal compressor.
Figure 2:
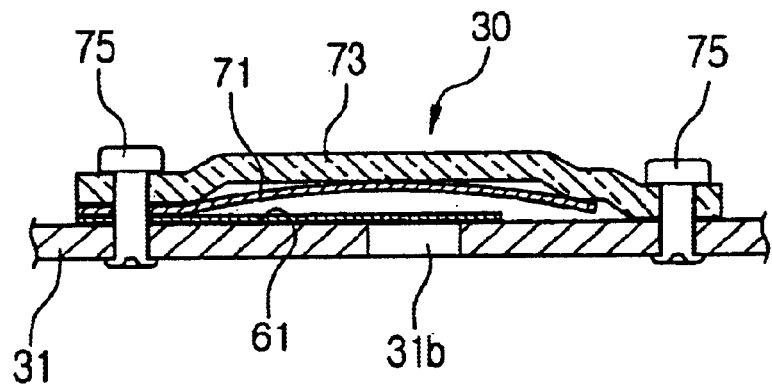
FIG. 2 is a partial enlarged view of FIG. 1.

From now on, the preferred embodiment of the present invention will be described by referring to the accompanying drawings. Throughout the description, the same referential numerals will be given to the same elements of the conventional compressor of FIG. 1, and the description will be omitted.

Figure 3:
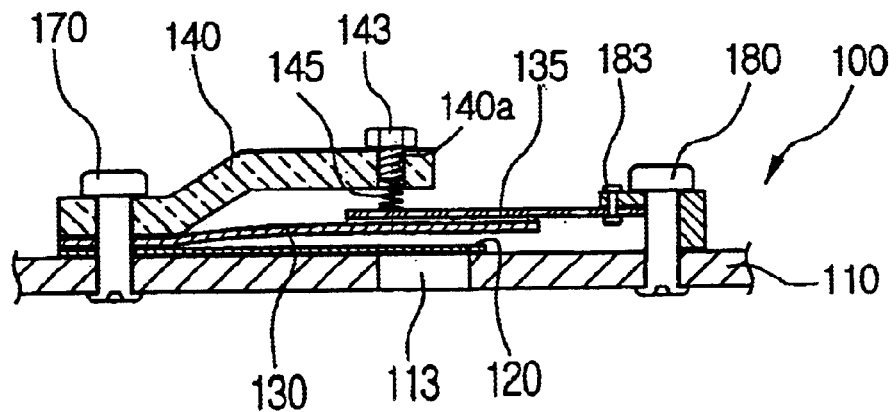
FIGS. 3 through 5 are enlarged sectional views of a valve assembly of a reciprocal compressor according to the present invention, showing respective operations of the valve assembly.

FIG. 3 is an enlarged sectional view of a valve assembly according to the present invention. The valve assembly 100 according to the present invention has a valve plate 110 having a suction hole (not shown) and a discharge hole 113, a keeper 140 secured to the valve plate 110 by a fastening bolt 170, a reed valve 120 secured between the valve plate 110 and the keeper 140, and a first and second stopper 130 and 135 for resisting against a deformation force of the reed valve 120.

The reed valve 120 opens and closes the discharge hole 113. While a piston 25 is moving from a top dead point to a bottom dead point, a cylinder device 21 draws in the refrigerant, and the reed valve 120 closes the discharge hole 113 air-tightly due to decrease of pressure in the cylinder chamber 23a. In addition, while the piston 25 is moving from the bottom dead point to the top dead point, the cylinder device 21 operates to discharge the refrigerant, and the refrigerant is discharged through the discharge hole 113 due to increase of pressure in the cylinder chamber 23a. The reed valve 120 receives the discharge pressure upwardly, and thus the reed valve 120 is bent upwardly.

The first stopper 130 is inserted between the keeper 140 and the valve plate 110, and is firmly secured by fixing pressure of the fastening bolt 170. The first stopper 130 adds a resisting force against the bending deformation force of the reed valve 120 bent upwardly when the refrigerant is discharged.

The second stopper 135 is disposed above the first stopper 130. A fastening member 180 for securing the second stopper 135 is formed at one end of the valve plate 110, and the second stopper 135 is firmly secured to the fixing member 180 by a stopper settling rivet 183. As shown in FIG. 3, an end of the second stopper 135 is overlapped with an end of the first stopper 130. In other words, the end of the second stopper 135 is overlapped with an area of the first stopper 130 connecting with the reed valve 120. Therefore, when the first stopper 130 is bent upwardly by the bending force of the reed valve 120, the end of the first stopper 130 contacts to the end of the second stopper 135, and accordingly, the second stopper 135 adds a resisting force against the bending force of the first stopper 130.

The keeper 140 is disposed above the second stopper 135. The keeper 140 limits the bending degree, when the second stopper 135 is bent upwardly by the first stopper 130. A penetrating hole 140a is formed at the keeper 140 right above the end of the second stopper 135. A screw thread is formed at an inner circumference of the penetrating hole 140a. An adjustment bolt 143 for connecting with the screw thread is formed at the penetrating hole 140a.

A spring 145 is disposed at a lower part of the adjustment bolt 143. The spring 145 is secured to the lower part of the adjustment bolt 143, and in accordance with a fastening degree of the adjustment bolt 143, in other words, in accordance with the depth of the fastening of the adjustment bolt 143, position of the spring 145 is adjusted upward and downward. Thus, as the position of is changed by adjusting the fastening degree of the adjusting bolt 143, not only the distance between the lower part of the adjusting bolt 143 and the second stopper 135 but also the distance between a lower part of the spring 145 and the second stopper 135 is adjusted.

The operation of the valve assembly 100 with the above construction will be described from now on.

Figure 4:
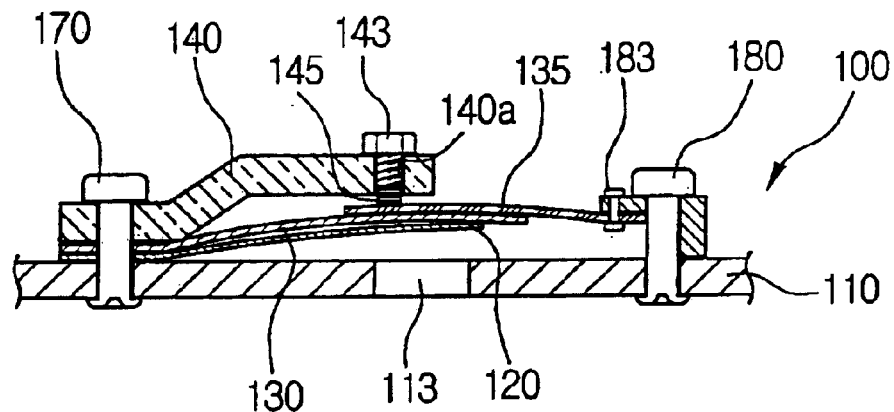

When the refrigerant is discharged through the discharge hole 113, the reed valve 120 is bent upwardly by the discharge pressure as shown in FIG. 4. At this time, the end of the bent reed valve 120 contacts with the first stopper 130, and the first stopper 130 adds the resisting force against the bending force of the reed valve 120. The first stopper 130 is slightly deformed by the deformation of the reed valve 120, and at the same time the end of the first stopper 130 is contacted to the end of the second stopper 135. The second stopper 135 adds the resisting force against the bending force of the first stopper 130, which is bent and deformed.

If the second stopper 135 is bent upwardly by the first stopper 130, the end of the second stopper 135 contacts to the lower part of the spring 145. Therefore, the second stopper 135 receives an elastic force against a deformation direction by the spring 145. When the spring 145 is compressed beyond a predetermined range due to great deformation of the second stopper 135 is great, the upper part of the keeper 140 contacts with the lower part of the keeper 140, and thus, the deformation range of the second stopper 135 is limited by the keeper 140.

As described so far, when the first stopper 130 is deformed beyond a predetermined range by the increased force given from the reed valve 120, a secondary and a tertiary resisting force is given by the spring 145. Therefore, when the discharge pressure in the cylinder chamber 23a is low, the resisting force is given to the reed valve 120 by the first stopper 130. When the discharge pressure is increased beyond a predetermined range due to some reasons, the reed valve 120 is bent and deformed for a bigger range, but the resisting force is given to the reed valve 120 by the second stopper 135 and the spring 145. In addition, when the discharge pressure increases, opening degree of the reed valve 120 can be increased to correspond to the increase of the discharge pressure, thus discharging of the compressed refrigerant is actively performed. Accordingly, refrigerant compressing efficiency is increased.

On the other hand, when there is a possibility that the discharge pressure in the cylinder chamber 23a increases abnormally, the biggest bending degree of the second stopper 135 can be adjusted by adjusting the adjustment bolt 143. In other words, if the adjustment bolt 143 is moved upwardly by a driver, not only the distance between the second stopper 135 and the adjustment bolt 143 but also the distance between the second stopper 135 and the spring 145 is increased, thus, the maximum deformation range of the first stopper 130 and second stopper 135 is increased.

Therefore, when the deformation range of the reed valve 120 increases in accordance with the increase of abnormal discharge pressure, the reed valve 120 and the first and the second stopper 130 and 135 can be bent corresponding to the extended range. Thus, as the pressure given to the reed valve 120 decreases, breakage of the reed valve 120 can be prevented and also noise is reduced due to the decrease of shock to the reed valve 120. In addition, when the discharge pressure increases, the opening degree of the reed valve 120 can be increased following the increase of the discharge pressure, since the compressed refrigerant is actively discharged, refrigerant compressing efficiency increases.

Figure 5:
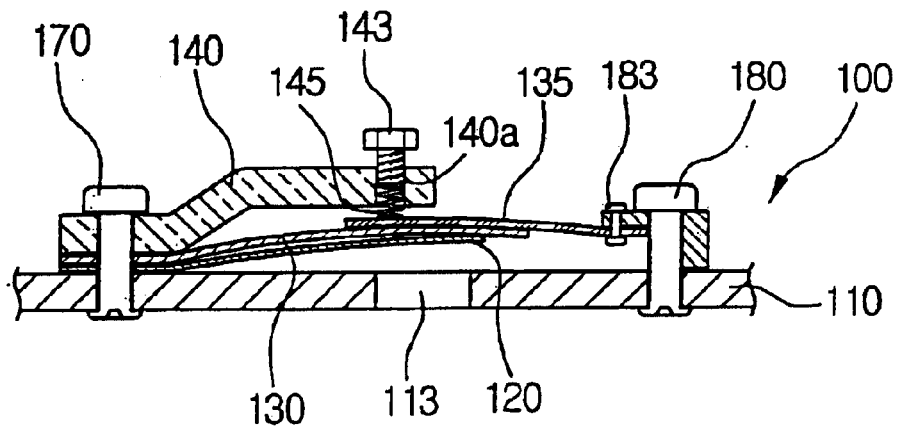

In the preferred embodiment of FIGS. 3 to 5, the valve assembly 100 having the second stopper 135, the adjusting bolt 143, and the spring 145 is illustrated, but the valve assembly 100 could be constructed to have only one or two of these three elements.

As described above, according to the present invention, discharging action of the refrigerant can be performed without any difficulties, since the resisting force against the deformation of the reed valve 120 is changed in accordance with the change of the discharge pressure of the refrigerant. Especially, since the maximum bending degree of the first and the second stopper 130 and 135 can be adjusted by the adjustment bolt 143, the reed valve 120 can be adjusted not to be loaded too mush when the discharge pressure of the refrigerant is abnormally increased. Accordingly, the compressing efficiency of the refrigerant can be increased. Also, the breakage of the reed valve 120 can be prevented, and the noise can be reduced.

Although the preferred embodiment of the present invention has been described, it will be understood by those skilled in the art that the present invention should not be limited to the described preferred embodiment. Various changes and modifications can be made within the spirit and scope of the present invention as defined by the appended claims.

What is claimed is:

1. A valve assembly of a reciprocal compressor, comprising:
   a valve plate disposed between a cylinder body and a cylinder head and having a refrigerant discharge hole formed thereon;
   a reed valve for opening/closing the refrigerant discharge hole;
   a first stopper for resisting a bending force of the reed valve bent by a discharge force of refrigerant while the refrigerant is discharged through the refrigerant discharge hole;
   at least one second stopper for resisting against a bending force of the first stopper caused by the reed valve;
   a keeper for limiting degree of bending of the second stopper caused by the first stopper; and
   a controlling means, installed on the keeper, for controlling a maximum bending degree of the second stopper.

2. The valve assembly of a reciprocal compressor of claim 1, wherein the first and the second stopper are disposed to be overlapped at a place adjacent to a position at which the first stopper and the reed valve are contacted to each other when the reed valve is bent.

3. The valve assembly of a reciprocal compressor of claim 1, wherein the controlling means is a spring disposed between the second stopper and the keeper.

4. The valve assembly of a reciprocal compressor of claim 1, wherein the controlling means further comprises a bolt assembled to the keeper and contacted to the second stopper bent by the first stopper, and distance between the second stopper and the bolt is controlled in accordance with a degree of assembly between the bolt and the keeper.

5. The valve assembly of a reciprocal compressor of claim 4, wherein the keeper has a penetrating hole having a screw part formed at an inner circumference thereof, the screw part for being engaged with another screw part formed on, and the bolt is assembled to penetrate the penetrating hole.

6. A valve assembly of a reciprocal compressor, comprising:
   a valve plate disposed between a cylinder body and a cylinder head and having a refrigerant discharge hole formed thereon;
   a reed valve for opening/sealing the refrigerant discharge hole;
   a stopper for resisting against a bending force of the reed valve while the refrigerant is discharged through the refrigerant discharge hole;
   a keeper for limiting the degree of bending of the stopper caused by the reed valve; and
   a bolt fastened to the keeper and connected with the stopper bent by the reed valve, and a distance between the stopper and the bolt is controlled in accordance with position of the bolt in the keeper.

7. The valve assembly of a reciprocal compressor of claim 6, wherein the keeper has a penetrating hole having a screw part formed at an inner circumference of the penetrating hole for being engaged with a screw part of the bolt, and the bolt is connected to penetrate the penetrating hole.

8. The valve assembly of a reciprocal compressor of claim 7, further comprising a spring for resisting against a bending force of the stopper, and the spring is inserted between the stopper and the bolt.

* * * * *